(12) United States Patent
Chung

(10) Patent No.: US 11,627,755 B2
(45) Date of Patent: Apr. 18, 2023

(54) PET FOOD AND MANUFACTURING METHOD THEREOF

(71) Applicant: Daejoo Inc., Seoul (KR)

(72) Inventor: Suk Won Chung, Seoul (KR)

(73) Assignee: DAEJOO INC., Seoul (KR)

( * ) Notice: Subject to any disclaimer, the term of this patent is extended or adjusted under 35 U.S.C. 154(b) by 14 days.

(21) Appl. No.: 17/405,108

(22) Filed: Aug. 18, 2021

(65) Prior Publication Data

US 2022/0053812 A1  Feb. 24, 2022

(30) Foreign Application Priority Data

Aug. 20, 2020 (KR) ........................ 10-2020-0104665

(51) Int. Cl.

| | | |
|---|---|---|
| *A23N 17/00* | (2006.01) | |
| *A23K 10/20* | (2016.01) | |
| *B65B 35/24* | (2006.01) | |
| *B65B 37/10* | (2006.01) | |
| *B65G 33/08* | (2006.01) | |
| *A23K 40/30* | (2016.01) | |
| *A23K 50/42* | (2016.01) | |
| *B65G 47/58* | (2006.01) | |
| *A23K 10/22* | (2016.01) | |
| *B65B 1/12* | (2006.01) | |
| *B65B 7/16* | (2006.01) | |
| *B65B 29/10* | (2006.01) | |

(52) U.S. Cl.
CPC ............ *A23N 17/007* (2013.01); *A23K 10/22* (2016.05); *A23K 40/30* (2016.05); *A23K 50/42* (2016.05); *B65B 1/12* (2013.01); *B65B 7/168* (2013.01); *B65B 35/24* (2013.01); *B65B 37/10* (2013.01); *B65G 33/08* (2013.01); *B65G 47/58* (2013.01); *B65B 29/10* (2013.01)

(58) Field of Classification Search
CPC ...... A23N 17/00; A23N 17/007; A23K 40/10; A23K 50/42; A23K 10/20; A23K 10/22; A23K 10/24; A23K 10/26; A23K 10/28; B65B 7/168; B65B 1/04; B65B 1/06; B65B 1/10–12; B65B 3/04; B65B 3/045; B65B 3/06; B65B 3/08; B65B 5/10; B65B 5/101; B65B 5/103; B65B 37/00; B65B 37/005; B65B 37/02; B65B 37/08; B65B 37/10; B65B 2220/14

See application file for complete search history.

(56) References Cited

U.S. PATENT DOCUMENTS

| | | | | |
|---|---|---|---|---|
| 3,139,342 A | * | 6/1964 | Linskey | ................ A23K 40/30 426/305 |
| 4,561,781 A | * | 12/1985 | Seymour | .............. A23N 17/007 241/101.8 |

(Continued)

*Primary Examiner* — Andrew M Tecco
(74) *Attorney, Agent, or Firm* — Rabin & Berdo, P.C.

(57) ABSTRACT

Disclosed are a pet food and a manufacturing method thereof. The pet food of the present invention includes a storage body having a can shape, an inner cap sealing an upper end of the storage body and provided in a disposable use, an outer cap detachably coupled to the storage body to cover the inner cap, and a plurality of feed bodies stored in the storage body, wherein a plurality of powder members are mixed in the storage body and when the storage body is shaken before feeding the feed to a pet, the plurality of powder members is coated on the plurality of feed bodies.

3 Claims, 7 Drawing Sheets

(56) References Cited

U.S. PATENT DOCUMENTS

| | | | | |
|---|---|---|---|---|
| 5,204,102 A * | 4/1993 | Coles | .................... | A23K 10/30 |
| | | | | 426/807 |
| 5,363,754 A * | 11/1994 | Coles | .................... | A23K 40/30 |
| | | | | 19/40 |
| 5,750,466 A * | 5/1998 | Wedegaertner | ........ | A23K 40/30 |
| | | | | 47/DIG. 9 |
| 5,935,626 A * | 8/1999 | Moechnig | ............ | A23K 20/147 |
| | | | | 426/89 |
| 6,000,585 A * | 12/1999 | Stewart | .................. | A47G 19/32 |
| | | | | 222/542 |
| 9,295,271 B2 * | 3/2016 | Rothamel | .............. | A23K 50/48 |
| 9,747,625 B2 * | 8/2017 | Travis | ................ | G06Q 30/0621 |
| 11,026,442 B2 * | 6/2021 | Majkrzak | ............... | A23K 30/12 |
| 2009/0123610 A1 * | 5/2009 | Mullin | .................... | A23L 33/15 |
| | | | | 426/115 |
| 2013/0108772 A1 * | 5/2013 | Rothamel | .............. | A23K 50/48 |
| | | | | 426/623 |
| 2016/0042421 A1 * | 2/2016 | Travis | ................ | G06Q 30/0621 |
| | | | | 705/26.5 |
| 2018/0250196 A1 * | 9/2018 | Warden | .................. | B65D 41/04 |
| 2019/0256230 A1 * | 8/2019 | Holka | .................... | B65D 51/20 |

* cited by examiner

PET FOOD AND MANUFACTURING METHOD THEREOF

CROSS-REFERENCE TO RELATED APPLICATIONS

This application claims the priority of Korean Patent Application No. 10-2020-0104665 filed on Aug. 20, 2020, in the Korean Intellectual Property Office, the disclosure of which is incorporated herein by reference.

BACKGROUND OF THE INVENTION

Field of the Invention

The present invention relates to a pet food, and more specifically, to a pet food and a manufacturing method thereof in which a feed is mixed with powder and packaged and then shaken before being fed to a pet so that the powder may be evenly coated on the feed.

Description of the Related Art

In recent years, as the nuclear family of the family is spreading, there is being increased a case where pets are bred in the house with the family, not outside the house.

Therefore, the pet is accepted as a member of the family that is living with people other than only an animal, and such a pet is referred to as a companion animal.

Particularly, as there is gradually increasing a case the pets are bred in the home, many pet foods have been variously developed and commercially available.

Such a pet food is usually prepared by adding additives which animals like in a feed material.

That is, the feed material is prepared using an apparatus for manufacturing the feed material, and additives are mixed to the prepared feed material to manufacture a pet food.

However, since existing feeds are not mixed properly with additives and are insufficient to make a favorable impression to the pet or improve affinity, the improvements thereof are required.

The above-described technical configuration is the background art for helping in the understanding of the present invention, and does not mean a conventional technology widely known in the art to which the present invention pertains.

SUMMARY OF THE INVENTION

Therefore, an object of the present invention is to provide a pet food and a manufacturing method thereof in which before feeding the feed, a can is shaken to give pleasure even to people, and pets sensitive the sound response to the sound to recognize the feeding of the feed to first go to an owner, and appetite is improved before eating to improve the affinity with the owner, and a space is ensured in the can to evenly mix the feed and the powder.

According to an aspect of the present invention, there is provided a pet food including a storage body having a can shape; an inner cap sealing an upper end of the storage body and provided in a disposable use; an outer cap detachably coupled to the storage body to cover the inner cap; and a plurality of feed bodies stored in the storage body, wherein a plurality of powder members are mixed in the storage body and when the storage body is shaken before feeding the feed to a pet, the plurality of powder members is coated on the plurality of feed bodies.

The powder members may be provided by freeze-drying, and may include at least one material of horse liver, chicken liver, chicken beasts, and dried Pollack.

According to another aspect of the present invention, there is provided a manufacturing method of a pet food including the steps of: conveying feed bodies to a combination meter through a feed body conveying unit; inputting the feed bodies metered by the combination meter to a storage body disposed in the index table; conveying the storage body to which the feed bodies is input to a powder member supply unit and then inputting powder members to the storage body from the powder member supply unit; providing, sealing, and seaming the inner cap in the storage body where the powder members are input; and providing the outer cap in the storage body provided with the inner cap.

The feed body conveying unit may include first horizontal frame provided on the ground; a vertical frame which is coupled vertically to the first horizontal frame; a second horizontal frame which is coupled to an upper end of the vertical frame and of which an end is disposed on the combination meter; a storage hopper which is coupled to the first horizontal frame and in which the feed bodies is stored; a conveying channel of which one side is coupled to the storage hopper to convey the feed bodies stored in the storage hopper; a lowering hopper which is provided at an end of the conveying channel to lower the feed bodies conveyed through the conveying channel in a direction of the first horizontal frame; a plurality of conveying hoppers which is provided to move sequentially along the first horizontal frame, the vertical frame, and the second horizontal frame to convey the feed bodies in a direction of the combination meter; a plurality of driving shafts which are rotatably provided in the first horizontal frame, the vertical frame, and the second horizontal frame to rotate chains connected with the plurality of conveying hoppers; and a falling hopper which is provided at the end of the second horizontal frame to fall the feed bodies supplied through the plurality of conveying hoppers to the combination meter.

The powder member supply unit may include a base body; a powder storage hopper which is coupled to the base body and stored with the powder members; a powder driving motor which is provided in the base body to provide power for conveying the powder members stored in the powder storage hopper; a powder supply screw of which one side is coupled to the powder driving motor to convey the powder members in an upper direction by rotation force; a powder falling guide body which is provided above the powder supply screw to guide the falling of the conveyed powder members; a powder falling hopper which is provided below the powder falling guide body to fall the powder members in a lower direction; a filling screw which is provided below the powder falling hopper to input the powder members to the storage body; and a filling funnel of which one side is provided at an end of the filling screw and the other side is disposed at an upper end of the storage body to guide the input of the powder, wherein a pair of powder member supply units is provided to be symmetrical to each other in a horizontal direction.

According to the embodiments of the present invention, since the feed bodies and the powder members are mixed and stored in the storage body, before feeding the feed, a can is shaken to give pleasure even to people, and pets sensitive the sound response to the sound to recognize the feeding of the feed to first go to an owner, and appetite is improved before eating to improve the affinity with the owner, and a space is ensured in the can to evenly mix the feed and the powder.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
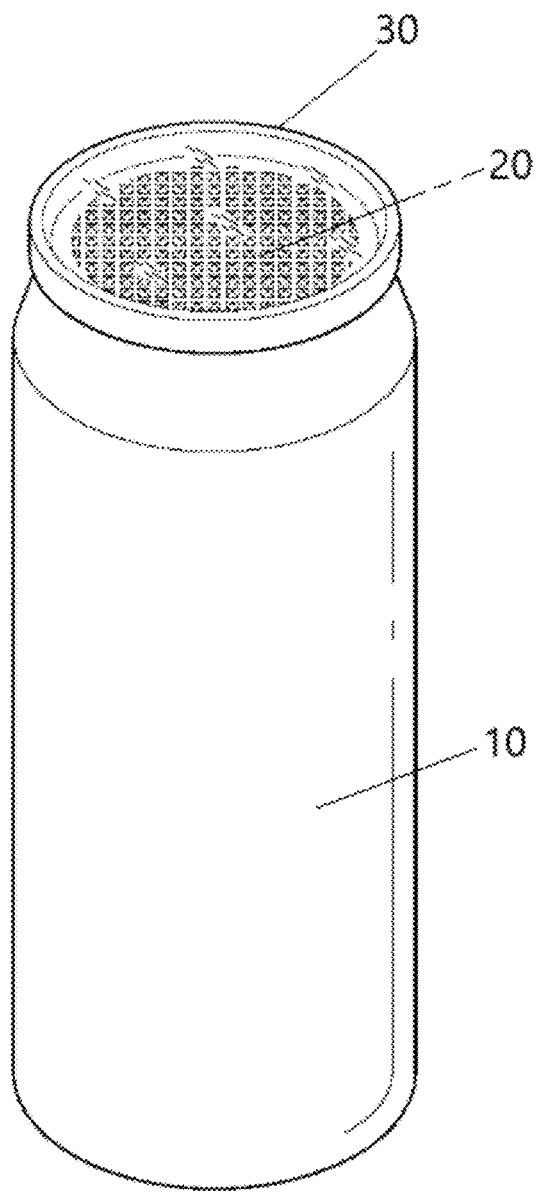
FIG. 1 is a diagram schematically illustrating a pet food according to an embodiment of the present invention.

In order to fully understand the present invention, operational advantages of the present invention and objects to be achieved by implementing the present invention, the present invention will be described with reference to the accompanying drawings which illustrate preferred embodiments of the present invention and the contents illustrated in the accompanying drawings.

Hereinafter, preferred embodiments of the present invention will be described in detail with reference to the accompanying drawings. Like reference numerals illustrated in the respective drawings designate like members.

Figure 2:
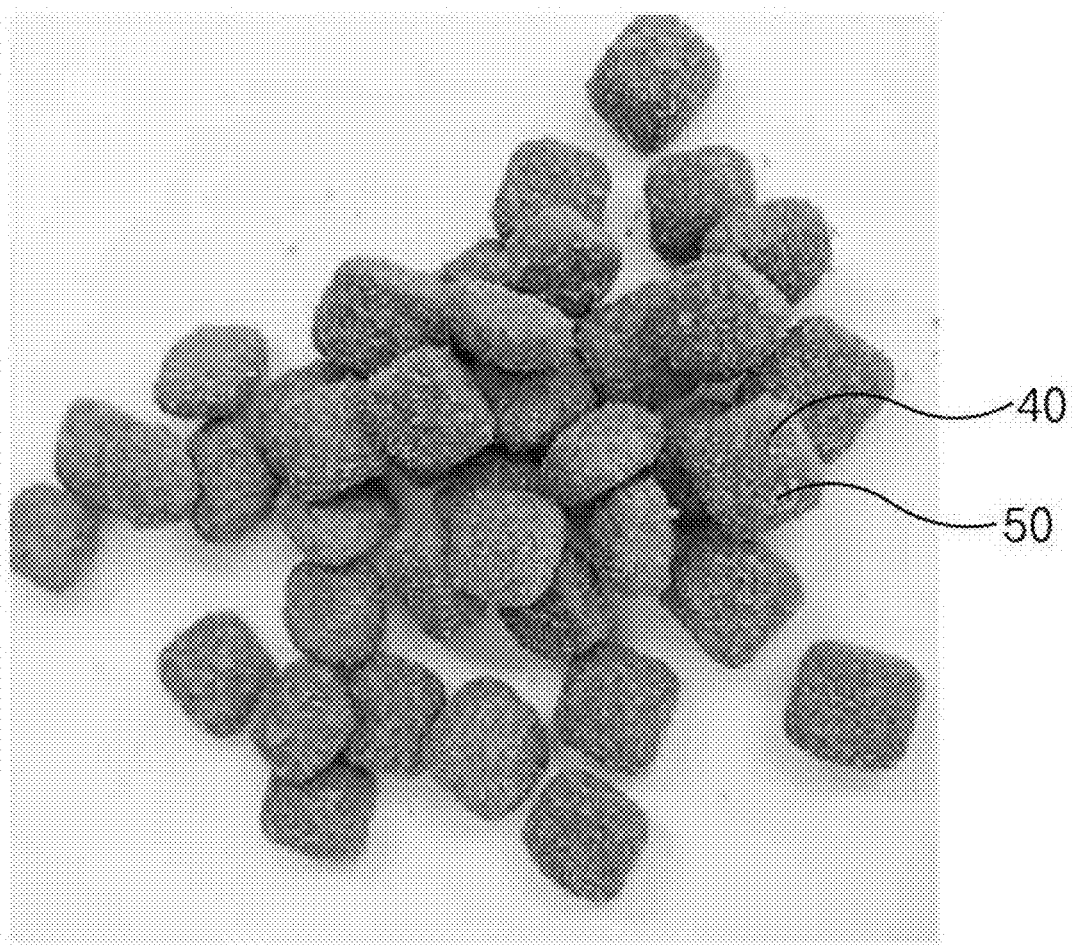
FIG. 2 is a diagram schematically illustrating that powder members are attached to feed bodies by shaking a storage body illustrated in FIG. 1.

FIG. 1 is a diagram schematically illustrating a pet food according to an embodiment of the present invention and FIG. 2 is a diagram schematically illustrating that powder members are attached to feed bodies by shaking a storage body illustrated in FIG. 1.

As illustrated in these drawings, the pet food according to the present embodiment includes a storage body 10, an inner cap 20 sealing an upper end of the storage body 10 and provided in a disposable use, an outer cap 30 detachably coupled to the storage body 10 to cover the inner cap 20, a plurality of feed bodies 40 stored in the storage body 10, and a plurality of powder members 50 stored in the storage body 10.

The storage body 10, as illustrated in FIG. 1, may have a cap shape, and the feed bodies 40 and the powder members 50 may be filled therein with a space therebetween. As a result, before feeding the feed, a can is shaken to give pleasure even to people, and pets sensitive the sound response to the sound to recognize the feeding of the feed to first go to an owner, and appetite is improved before eating and the affinity with the owner is improved. Further, when the space is secured inside the storage body 10 and the storage body 10 is shaken to evenly mix the feed bodies 40 and the powder members 50.

In this embodiment, the storage body 10 and the inner cap 20 may be provided with a material containing aluminum.

The inner cap 20 seals the upper end of the storage body 10 as illustrated in FIG. 1, and the inner cap 20 may be removed at the time of first supplying the feed.

As illustrated in FIG. 1, the outer cap 30 is coupled to the storage body 10 to cover the inner cap 20 and may be detachably fitted to the storage body 10 so as to store the feed after the feed is fed once to the pet.

In the embodiment, the outer cap 30 may be provided with a transparent material, and may be provided with a material containing plastic.

The feed bodies 40 may be made of a known material provided to a general pet, and may be provided in a shape including a quadrangular or circular shape.

The powder members 50 may be provided by freeze-drying, and may include at least one material of horse liver, chicken liver, chicken beasts, and dried Pollack.

Figure 3:
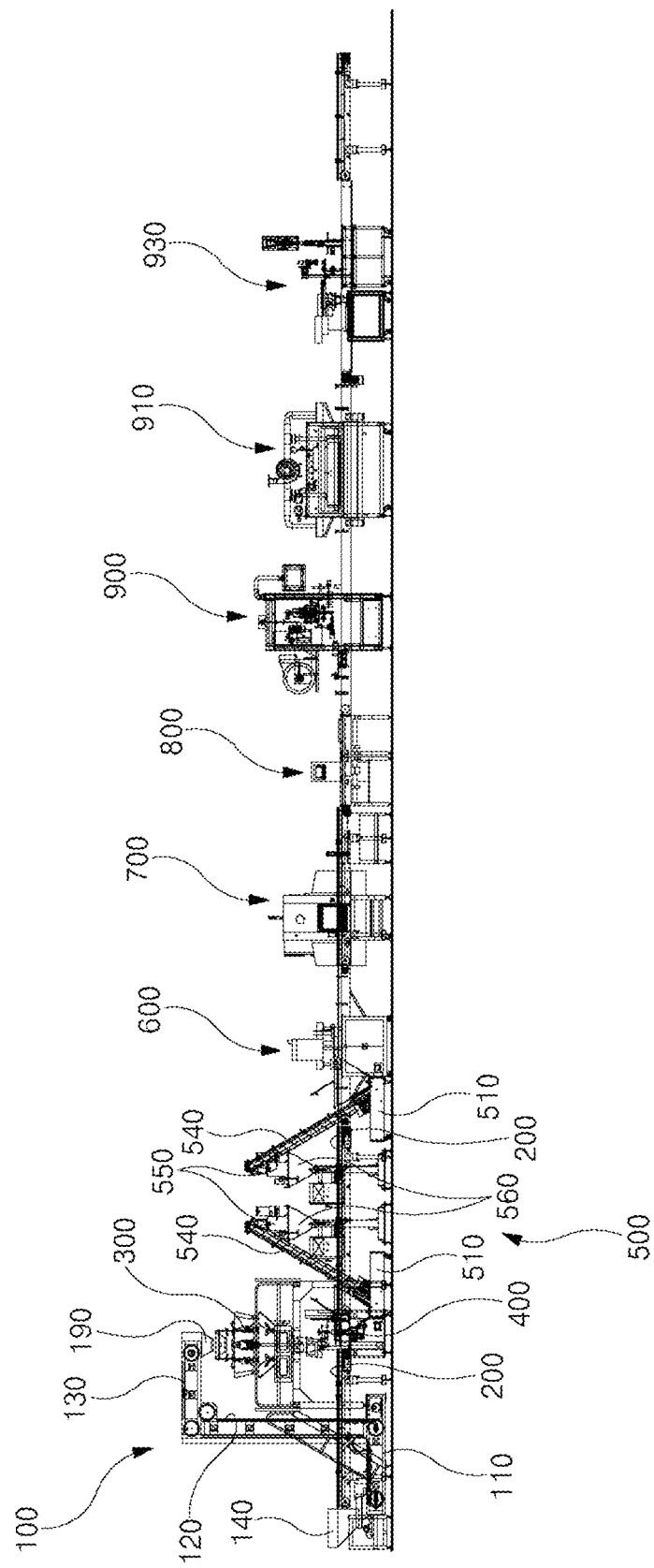
FIG. 3 is a diagram schematically illustrating a system of manufacturing the pet food illustrated in FIG. 1.
Figure 4:
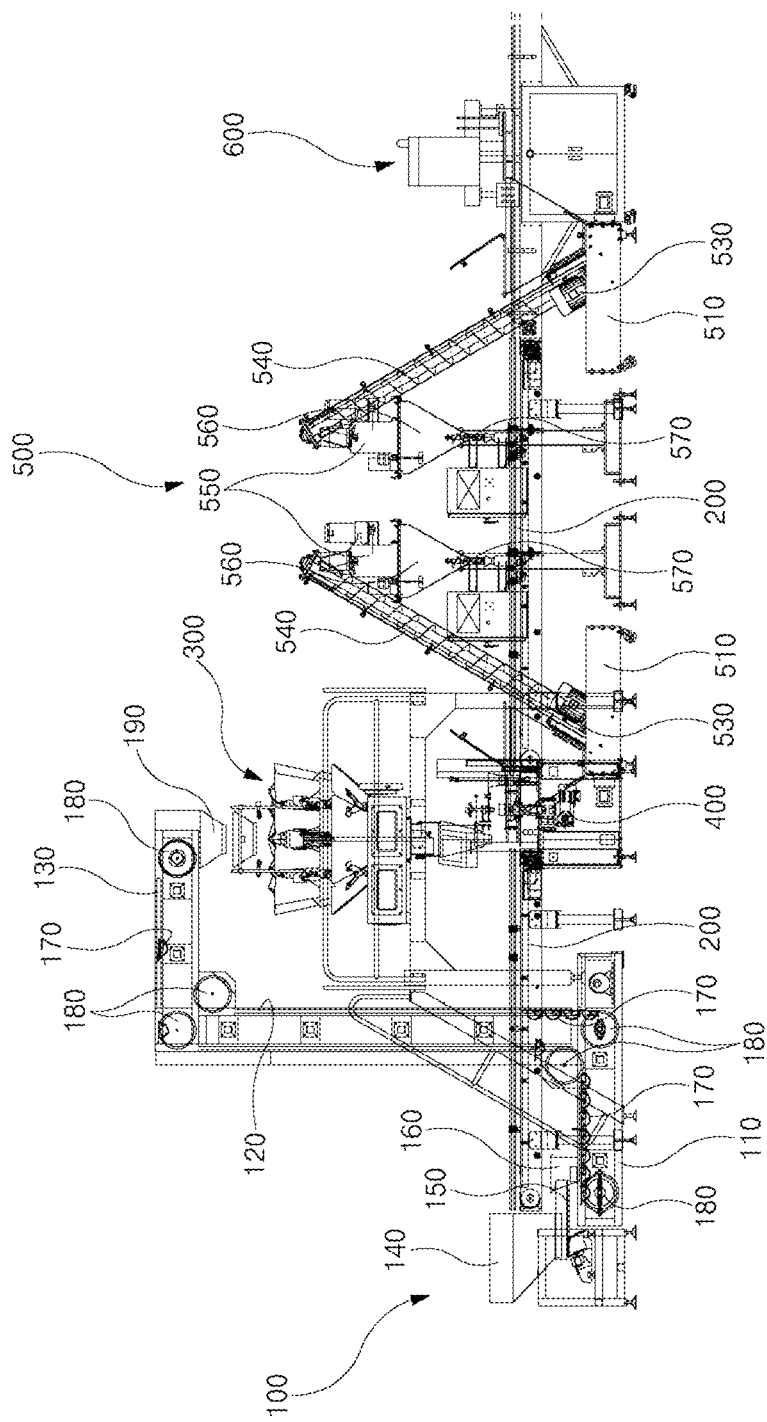
FIG. 4 is a diagram schematically illustrating a feed body conveying unit, a storage body conveying unit, a combination meter, an index table, a powder member supply unit, and a seaming device, which are illustrated in FIG. 3.
Figure 5:
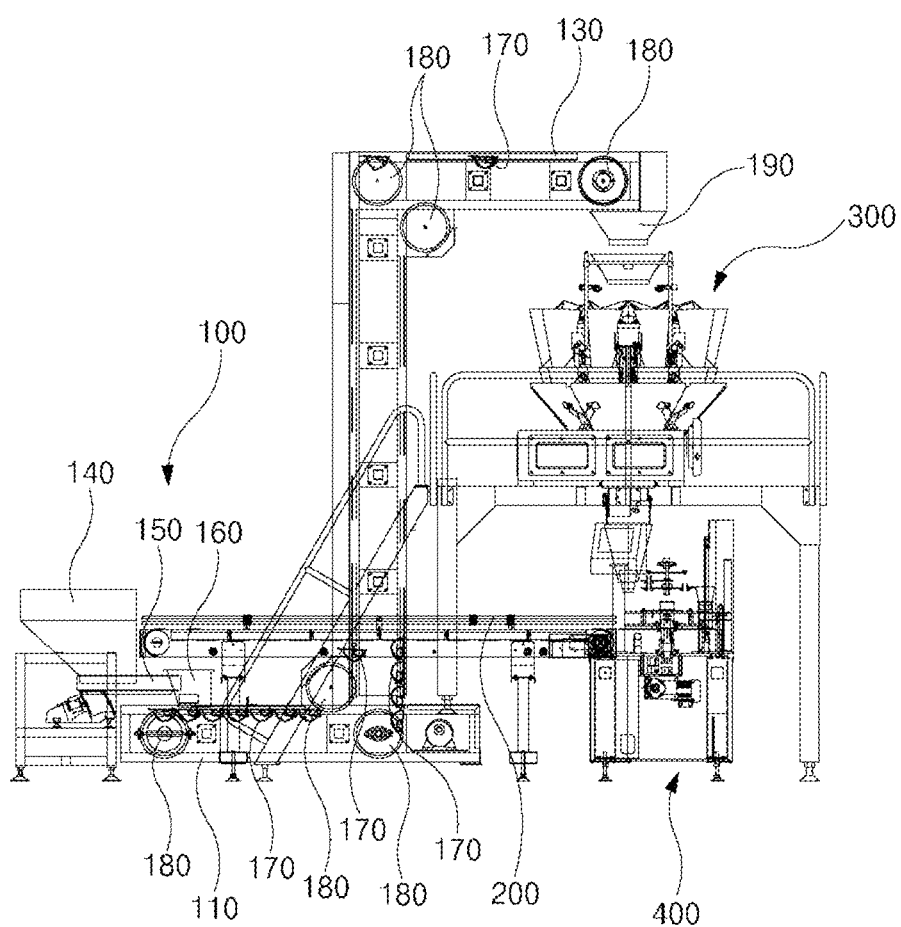
FIG. 5 is a diagram schematically illustrating the feed body conveying unit, the storage body conveying unit, the combination meter, and the index table, which are illustrated in FIG. 4.
Figure 6:
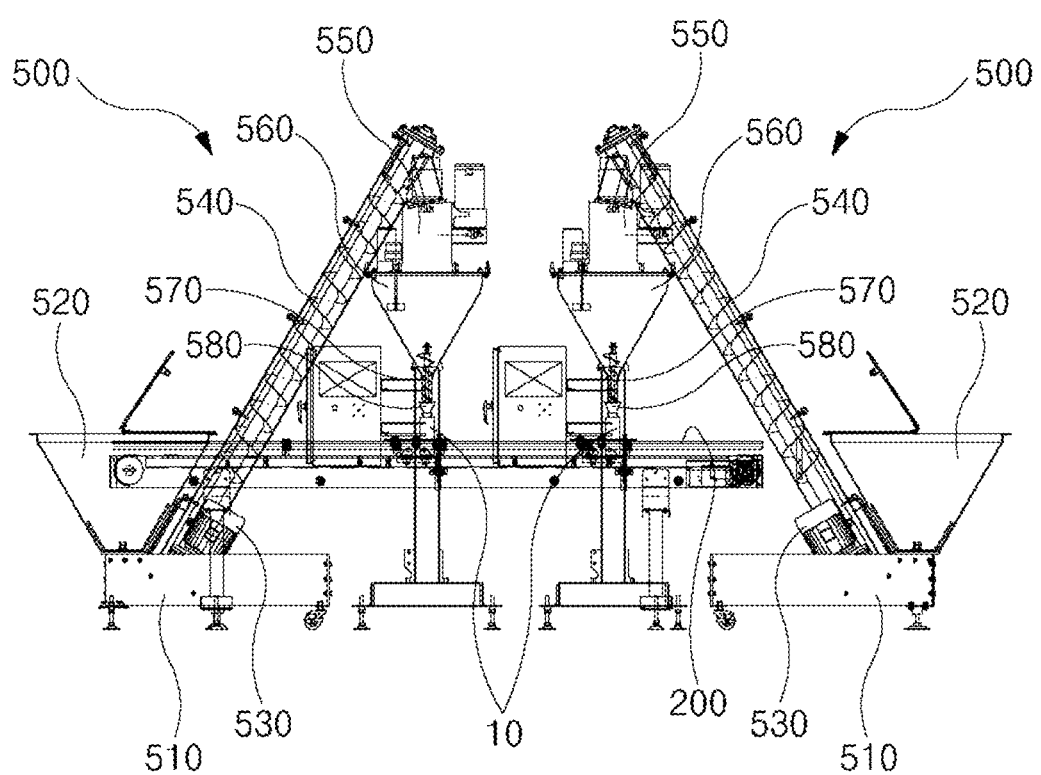
FIG. 6 is a diagram schematically illustrating a pair of the powder member supply unit and the storage body conveying unit illustrated in FIG. 4.
Figure 7:
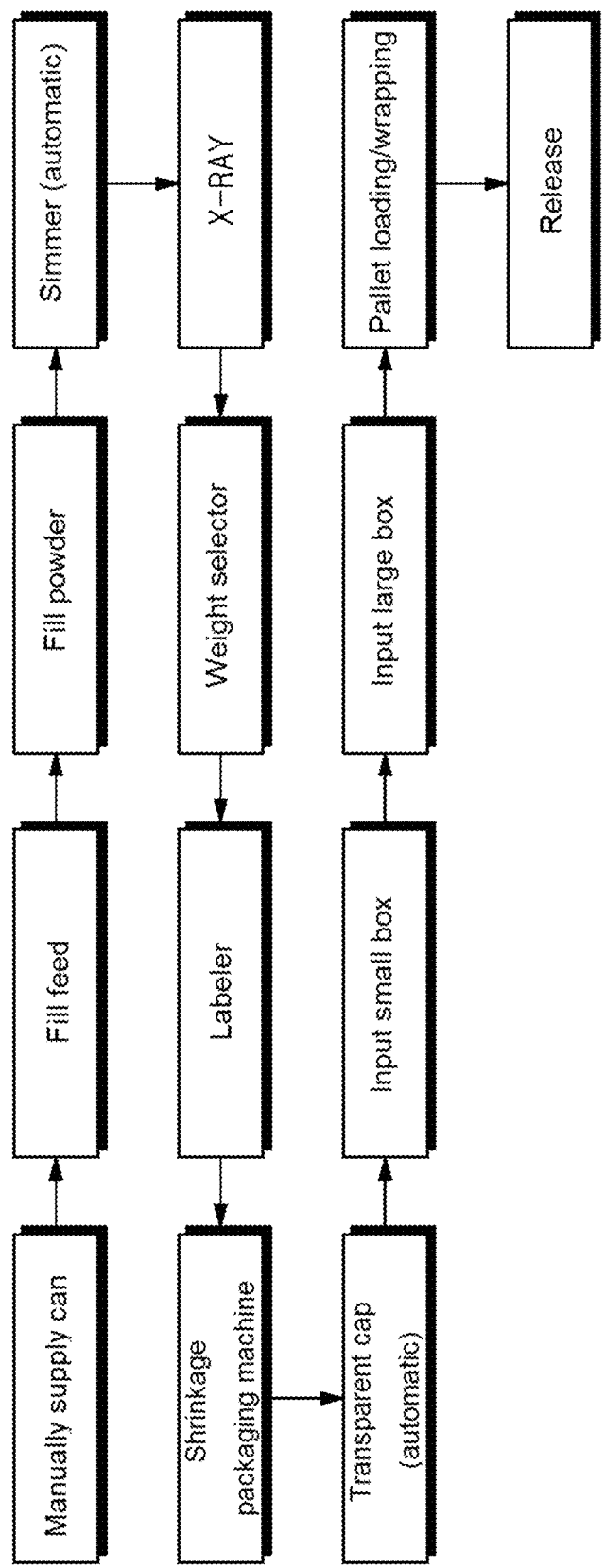
FIG. 7 is a schematic flowchart of a manufacturing method of the present embodiment.

FIG. 3 is a diagram schematically illustrating a system of manufacturing the pet food illustrated in FIG. 1, FIG. 4 is a diagram schematically illustrating a feed body conveying unit 100, a storage body conveying unit 200, a combination meter 300, an index table 400, a powder member supply unit 500, and a seaming device, which are illustrated in FIG. 3, FIG. 5 is a diagram schematically illustrating the feed body conveying unit 100, the storage body conveying unit 200, the combination meter 300, and the index table 400, which are illustrated in FIG. 4, FIG. 6 is a diagram schematically illustrating a pair of the powder member supply unit 500 and the storage body conveying unit 200 illustrated in FIG. 4, and FIG. 7 is a schematic flowchart of a manufacturing method of the present embodiment.

Hereinafter, a manufacturing method of the present embodiment will be described.

A manufacturing method of the pet food according to the present embodiment includes conveying feed bodies 40 to a combination meter 300 through a feed body conveying unit 100, inputting the feed bodies 40 metered by the combination meter 300 to a storage body 10 disposed in the index table 400, conveying the storage body 10 to which the feed bodies 40 is input to a powder member supply unit 500 and then inputting powder members 50 to the storage body 10 from the powder member supply unit 500, providing, sealing, and seaming the inner cap 20 in the storage body 10 where the powder members 50 is input, and providing the outer cap 30 in the storage body 10 provided with the inner cap 20.

The feed body conveying unit 100 is to convey the feed bodies 40 to the combination meter 300, and as illustrated in FIG. 5, includes a first horizontal frame 110 provided on the ground, a vertical frame 120 which is bolt or welding-coupled vertically to the first horizontal frame 110, a second horizontal frame 120 which is coupled to an upper end of the vertical frame 120 and of which an end is disposed on the combination meter 300, a storage hopper 140 which is bolt or welding-coupled to the first horizontal frame 110 and in which the feed bodies 40 is stored, a conveying channel 150 of which one side is coupled to the storage hopper 140 to convey the feed bodies 40 stored in the storage hopper 140, a lowering hopper 160 which is provided at an end of the conveying channel 150 to lower the feed bodies 40 conveyed through the conveying channel 150 in a direction of the first horizontal frame 110, a plurality of conveying hoppers 170 which is provided to move sequentially along the first horizontal frame 110, the vertical frame 120, and the second horizontal frame 120 to convey the feed bodies 40 in a direction of the combination meter 300, a plurality of driving shafts 180 which are rotatably provided in the first horizontal frame 110, the vertical frame 120, and the second horizontal frame 120 to rotate chains connected with the plurality of conveying hoppers 170, and a falling hopper 190 which is provided at the end of the second horizontal frame 120 to fall the feed bodies 40 supplied through the plurality of conveying hoppers 170 to the combination meter 300.

Hereinafter, an operation of the feed body conveying unit 100 will be briefly described.

The feed bodies 40 stored in the storage hopper 140 may be supplied to the lowering hopper 160 through the conveying channel 150. At this time, through a convey means such as a fan, a screw, or the like provided on the conveying channel 150, the feed bodies 40 may be supplied to the lowering hopper 160 in the conveying channel 150.

The feed bodies 40 lowered by the lowering hopper 160 may be supplied to the falling hopper 190 through the plurality of conveying hoppers 170 which are rotatably in the first horizontal frame 110, the vertical frame 120, and the second horizontal frame 120 and then input to the combination meter 300. In the embodiment, the plurality of conveying hoppers 170 is connected with the plurality of driving shafts 180 provided in the first horizontal frame 110, the vertical frame 120, and the second horizontal frame 120 through chains or belts to continuously rotate on the first horizontal frame 110, the vertical frame 120, and the second horizontal frame 120.

The storage body conveying unit 200 may convey the storage body 10 on a support plate in a direction of the index table 400 through chains or belts.

In this embodiment, the storage body conveying unit 200 may be disposed between a pair of powder member supply unit 500 as illustrated in FIG. 6.

The combined meter 300 is used to solve a problem that there is a difference depending on the proficiency of a person who packs the feed such that the feed bodies 40 are less than or more than a predetermined amount, and a known configuration may be applied as it is.

In the embodiment, the combination meter 300 may include a guide hopper which is disposed below the falling hopper 190 to be discharged in a lower direction, a table unit which is disposed below the guide hopper and includes a plurality of distribution panel units arranged along a circumference based on the central portion of the guide hopper to distribute the feed bodies 40, a supply bucket which is disposed for each lower outer periphery of each distribution panel unit and supplied and filled with the distributed feed bodies 40 to discharge the feed bodies 40 in a lower direction by a door opening/closing method, a weight bucket which is disposed below the supply bucket and filled with the feed bodies 40 discharged from the supply bucket to discharge the feed bodies 40 in a lower direction by a door opening/closing method, and meters the weight of the feed bodies 40 filled through a load cell, and a slider which is disposed below the weight bucket and combines the feed bodies 40 discharged from the weight bucket to discharge the feed bodies 40 to the outside by a door opening/closing method.

As illustrated in FIG. 5, the index table 400 may be disposed below the combination meter 300 to be provided as a displacement place of a lower body where the feed bodies 40 are to be stored.

In the embodiment, the storage body 10 in which the feed bodies 40 are input in the index table 400 may be supplied to a pair of powder member supply units 500 through the storage body conveying unit 200 illustrated in FIG. 4.

The powder member supply unit 500 is to input the powder members 50 to the storage body 10 where the feed bodies 40 are stored. As illustrated in FIG. 6, the powder member supply unit 500 includes a base body 510, a powder storage hopper 520 which is coupled to the base body 510 and stored with the powder members 50, a powder driving motor 530 which is provided in the base body 510 to provide power for conveying the powder members 50 stored in the powder storage hopper 520, a powder supply screw 540 of which one side is coupled to the powder driving motor 530 to convey the powder members 50 in an upper direction by rotation force, a powder falling guide body 550 which is provided above the powder supply screw 540 to guide the falling of the conveyed powder members 50, a powder falling hopper 560 which is provided below the powder falling guide body 550 to fall the powder members 50 in a lower direction, a filling screw 570 which is provided below the powder falling hopper 560 to input the powder members 50 to the storage body 10, and a filling funnel 580 of which one side is provided at an end of the filling screw 570 and the other side is disposed at an upper end of the storage body 10 to guide the input of the powder.

Hereinafter, an operation of the powder member supply unit 500 will be briefly described.

The powder members 50 stored in the powder storage hopper 520 are conveyed to the upper end illustrated in FIG. 6 through the powder supply screw 540 rotated by the operation of the powder driving motor 530, and the conveyed powder members 50 may be supplied to the powder falling hopper 560 through the powder falling guide body 550.

The powder members 50 supplied to the powder falling hopper 560 may be supplied to the filling funnel 580 uniformly by the rotation of the filling screw 570 disposed below the powder falling hopper 560.

The powder members 50 supplied to the filling funnel 580 may be stably added without spilling by the filling funnel 580 to the storage body 10 conveyed by the storage body conveying unit 200.

The seaming device 600 has the inner cap 20 on the storage body 10, and a known seaming device may be applied as it is.

With respect to an X-ray unit 700, a weight selector 900, a load check unit 800, and a labeler 910 sealing an expiration date, known techniques may be applied as they are.

An outer cap coupling device 930 couples an outer cap made of a plastic material to the storage body 10 provided with the inner cap, and a known technique may be applied as it is.

As described above, in the embodiment, since the feed bodies and the powder members are mixed and stored in the storage body, before feeding the feed, a can is shaken to give pleasure even to people, and pets sensitive the sound response to the sound to recognize the feeding of the feed to first go to an owner, and appetite is improved before eating to improve the affinity with the owner, and a space is ensured in the can to evenly mix the feed and the powder.

As described above, the present invention is not limited to the embodiments described herein, and it will be apparent to those skilled in the art that various changes and modifications may be made without departing from the spirit and the scope of the present invention. Therefore, it will be understood that these changes and modifications are included in the appended claims of the present invention.

What is claimed is:

1. A manufacturing method of a pet food comprising the steps of:
    conveying feed bodies to a combination meter through a feed body conveying unit;
    inputting the feed bodies metered by the combination meter to a storage body disposed in an index table;

conveying the storage body to which the feed bodies are input to a powder member supply unit and then inputting powder members to the storage body from the powder member supply unit;

providing, sealing, and seaming an inner cap in the storage body where the powder members are input; and providing an outer cap in the storage body provided with the inner cap.

2. The manufacturing method of the pet food of claim 1, wherein the feed body conveying unit includes:

a first horizontal frame provided on the ground;

a vertical frame which is coupled vertically to the first horizontal frame;

a second horizontal frame which is coupled to an upper end of the vertical frame and of which an end is disposed on the combination meter;

a storage hopper which is coupled to the first horizontal frame and in which the feed bodies are stored;

a conveying channel of which one side is coupled to the storage hopper to convey the feed bodies stored in the storage hopper;

a lowering hopper which is provided at an end of the conveying channel to lower the feed bodies conveyed through the conveying channel in a direction of the first horizontal frame;

a plurality of conveying hoppers which is provided to move sequentially along the first horizontal frame, the vertical frame, and the second horizontal frame to convey the feed bodies in a direction of the combination meter;

a plurality of driving shafts which are rotatably provided in the first horizontal frame, the vertical frame, and the second horizontal frame to rotate chains connected with the plurality of conveying hoppers; and a falling hopper which is provided at the end of the second horizontal frame to fall the feed bodies supplied through the plurality of conveying hoppers to the combination meter.

3. The manufacturing method of the pet food of claim 2, wherein the powder member supply unit includes:

a base body;

a powder storage hopper which is coupled to the base body and stored with the powder members;

a powder driving motor which is provided in the base body to provide power for conveying the powder members stored in the powder storage hopper;

a powder supply screw of which one side is coupled to the powder driving motor to convey the powder members in an upper direction by rotation force;

a powder falling guide body which is provided above the powder supply screw to guide the falling of the conveyed powder members;

a powder falling hopper which is provided below the powder falling guide body to fall the powder members in a lower direction;

a filling screw which is provided below the powder falling hopper to input the powder members to the storage body; and a filling funnel of which one side is provided at an end of the filling screw and the other side is disposed at an upper end of the storage body to guide the input of the powder, wherein a pair of powder member supply units is provided to be symmetrical to each other in a horizontal direction.

* * * * *